United States Patent [19]
Westerink et al.

[11] Patent Number: 6,027,536
[45] Date of Patent: Feb. 22, 2000

[54] METHOD FOR THE PREPARATION OF A MATERIAL WITH HIGH WATER AND SALT SOLUTIONS ABSORBENCY

[75] Inventors: Jan Barend Westerink, Lochem; Hanneke Boerstoel; Hendrik Maatman, both of Arnhem, all of Netherlands

[73] Assignee: AKZO Nobel N.V., Arnhemn, Netherlands

[21] Appl. No.: 09/117,876

[22] PCT Filed: Feb. 12, 1997

[86] PCT No.: PCT/EP97/00652

§ 371 Date: Aug. 6, 1998

§ 102(e) Date: Aug. 6, 1998

[87] PCT Pub. No.: WO97/30090

PCT Pub. Date: Aug. 21, 1997

[30] Foreign Application Priority Data

Feb. 14, 1996 [NL]  Netherlands ........................... 1002335

[51] Int. Cl.$^7$ ........................................................ H01J 8/45
[52] U.S. Cl. .......................................... 8/127.1; 162/157.6
[58] Field of Search ........................... 8/127.1; 162/157.6

[56] References Cited

U.S. PATENT DOCUMENTS

| | | |
|---|---|---|
| 429,535 | 6/1890 | Achilles de Khotinsky . |
| 3,658,790 | 4/1972 | Bernardin . |
| 3,691,154 | 9/1972 | Bernardin . |

FOREIGN PATENT DOCUMENTS

| | | |
|---|---|---|
| 1275503 | 9/1957 | Germany . |
| 1185571 | 1/1965 | Germany . |
| 1203725 | 10/1965 | Germany . |
| 47-42080 | 10/1972 | Japan . |
| 263810 | 12/1926 | United Kingdom . |
| WO 93/12275 | 6/1993 | WIPO . |
| WO 96/06208 | 2/1996 | WIPO . |

OTHER PUBLICATIONS

Brian R. Shmaefsky, "How–to–do–it, Artificial Urine for Laboratory Testing", *The American Biology Teacher*, vol. 52, No. 3, Mar. 1990, pp. 170–172.

*Primary Examiner*—Margaret Einsmann
*Attorney, Agent, or Firm*—Oliff & Berridge, PLC

[57] ABSTRACT

A process for preparing a material having a high water and salt solutions absorbency, the material containing mainly cellulose that is dissolved in a solvent containing phosphoric acid, a solution is obtained that contains 94–100 wt. % of the following constituents:

cellulose, phosphoric acid and/or its anhydrides, and water, the solution is then coagulated and washed in a liquid containing less than 50 wt. % of water. This process can be used to obtain cellulose products, such as fibers or pulp, which have a high water and (isotonic) salt solutions absorbency.

16 Claims, No Drawings

METHOD FOR THE PREPARATION OF A MATERIAL WITH HIGH WATER AND SALT SOLUTIONS ABSORBENCY

FIELD OF INVENTION

The invention pertains to a process for the preparation of a material with a high water and salt solutions absorbency, said material containing mainly cellulose.

A material with a high water and (isotonic) salt solutions absorbency is also known as a superabsorbent. Superabsorbents are used, int. al., in personal hygiene products, such as disposable diapers, tampons, sanitary napkins, and incontinence pads. Superabsorbents in the form of fibres can be used, int. al., in moisture-absorbing cloths or in towels.

DESCRIPTION OF RELATED ART

A superabsorbent mainly containing cellulose is known from WO 93/112275. In this patent application the preparation of cellulose based superabsorbents, notably cellulose based fibres, is described, which comprises cellulose fibres being spun and the thus formed fibres being subjected to chemical modification in a subsequent process to form carboxy-methyl-cellulose (CMC) fibres. However, preparing a material with a high water and salt solutions absorbency in two different process steps (spinning the fibres and subjecting them to chemical modification) constitutes a substantial drawback to this process.

CMC in the powdered form is known as a material with a high moisture absorbency and is used, int. al., as a thickener.

U.S. Pat. No. 3,658,790 also discloses a process for preparing cellulose based fibres with a high absorbent capacity for fluid. This process involves several steps, such as saturating cellulose fibres (in the form of pulp sheets) with an aqueous phosphoric acid/urea solution, drying and reacting the obtained product at elevated temperature, dispersing the obtained sheets in water, a washing treatment, a treatment with acid, a treatment with lye, a second washing treatment, and, optionally, mechanical refining of the obtained product. Shaping of the obtained fibres is only possible by an extra process step In addition to these superabsorbents, superabsorbents containing salts of polyacrylic acids are known. A drawback to materials based on the salts of polyacrylic acids is their poor biodegradability as compared with cellulose based materials.

Surprisingly, a simple process for preparing superabsorbents which mainly contain cellulose has now been found. This process makes it possible to prepare a material with a high water and (isotonic) salt solutions absorbency which has better biodegradability than the materials based on polyacrylic acids.

SUMMARY OF THE INVENTION

The invention consists in that in the process mentioned in the opening paragraph cellulose is dissolved in a solvent containing phosphoric acid, with a solution being obtained which has 94–100 wt. % of the following constituents:
cellulose,
phosphoric acid and/or its anhydrides, and
water,
and the solution is coagulated and washed in a liquid containing less than 50 wt. % of water.

DETAILED DESCRIPTION OF PREFERRED EMBODIMENTS

The term phosphoric acid in this patent application refers to all inorganic acids of phosphorus and their mixtures. Orthophosphoric acid is the acid of pentavalent phosphorus, i.e. $H_3PO_4$. Its anhydrous equivalent, i.e. the anhydride, is phosphorus pentoxide ($P_2O_5$). In addition to orthophosphoric acid and phosphorus pentoxide there is, depending on the quantity of water in the system, a series of acids of pentavalent phosphorus with a water-binding capacity in between those of phosphorus pentoxide and orthophosphoric acid, such as polyphosphoric acid ($H_6P_4O_{13}$, PPA).

The weight percentage of phosphorus pentoxide in the solvent is calculated by starting from the overall quantity by weight of phosphoric acid including its anhydrides and the total quantity of water in the solvent, converting the acids into phosphorus pentoxide and water, and calculating the percentage of said overall quantity by weight made up by phosphorus pentoxide.

In this description water derived from cellulose or from substances which are part of the other constituents and water which is added to obtain the solution are not included in the calculation of the concentration of phosphorus pentoxide in the solvent.

The weight percentage of phosphorus pentoxide in the solution is calculated by starting from the overall quantity by weight of phosphoric acid including its anhydrides and the total quantity of water in the solution, converting the acids into phosphorus pentoxide and water, and calculating which percentage of said overall quantity by weight is made up by phosphorus pentoxide. For that reason in this description water derived from cellulose or from substances which are part of the other constituents and water which is added to obtain the solution are included in the calculation of the concentration of phosphorus pentoxide in the solution.

The weight percentage of cellulose in the solution is calculated by starting from the overall quantity by weight of all constituents in the solution.

In addition to water, phosphoric acid and its anhydrides, and cellulose and/or reaction products of phosphoric acid and cellulose, other substances may be present in the solution.

Thus the solution can be prepared by mixing constituents classifiable into four groups: cellulose, water, inorganic acids of phosphorus including their anhydrides, and other constituents. The "other constituents" may be substances which benefit the processability of the cellulose solution, solvents other than phosphoric acid, or adjuvants (additives), e.g., to counter cellulose decomposition as much as possible, or dyes and the like.

Cellulose to which phosphorus is bound is also included among the group of constituents making up 94–100 wt. % of the solution. In the case of cellulose-bound phosphorus, the percentages by weight of cellulose in the solution listed in this patent specification relate to quantities calculated back on the cellulose. This applies in analogous fashion to the quantities of phosphorus mentioned in this specification.

The solution used in the process according to the invention can be obtained as described in published patent application WO 96/06208 in the name of Applicant. To dissolve the cellulose in phosphoric acid more quickly, WO 96/06208 describes reducing the size of the cellulose and/or mixing the cellulose and phosphoric acid composition.

As is described in this application, it was found that the time, the temperature at which the solution is stored, and the acid concentration have a significant effect on the quantity of cellulose-bound phosphorus in the solution. Also, it was found that the extruded solution's water absorption is dependent on the quantity of cellulose-bound phosphorus in the solution.

In order to obtain products having the highest possible water absorption, the solution preferably contains more than 1,5 wt. %, more particularly more than 3 wt. %, of cellulose-bound phosphorus.

There were found to be various ways of influencing the content of cellulose-bound phosphorus in the solution. Increasing the temperature at which the solution is prepared/stored will give an increase in this content. However, at elevated temperature there will also be accelerated cellulose degradation.

This degradation is reflected in a decrease of the degree of polymerisation (DP) of the cellulose. Alternatively, it was found that the content of cellulose-bound phosphorus can be increased by increasing the concentration of phosphorus pentoxide in the solvent. This has very little effect on the cellulose degradation.

To effect the dissolution of cellulose within a short period of time and with little cellulose degradation, the solvent preferably contains water and 65–85 wt. % of phosphorus pentoxide, more particularly water and 70–80 wt. % of phosphorus pentoxide.

The solution preferably contains 96–100 wt. % of the constituents cellulose, phosphoric acid and/or its anhydrides, and water.

Adjuvants or additives preferably are present only in quantities of 0 to 4 wt. %, calculated on the overall quantity by weight of the solution. More advantageous yet is a solution containing the lowest possible quantity of substances other than constituents from the group of cellulose, phosphoric acid and/or its anhydride, and water, i.e., containing 0 to 1 wt. % of additives.

In the process according to the invention the solution is coagulated and washed in a liquid containing less than 50 wt. % of water. Given that the coagulated solution will swell when it is contacted with water, which swelling may be less desired with a view to further processing/treatment of the coagulated solution, preferably the solution is coagulated and washed in a liquid containing less than 10 wt. % of water, more preferably in a liquid which is essentially anhydrous. In this application, a liquid is deemed to be essentially anhydrous when it contains less than 5 wt. % of water.

In order to make products having such a form or appearance as will render them suitable for use as superabsorbents without any additional preparative step, it is preferred to give the solution the desired form prior to or during coagulation, e.g., by contacting the solution with the coagulant in a rapidly rotating mixer, to give minute particles as, e.g. fibroids, or by extruding the solution in the coagulant, to give extrudates in a form dependent on the extrusion die, e.g., fibres, continuous filaments, or films.

Suitable coagulants can be selected from the group of low-boiling organic solvents or mixtures of these solvents. Examples of such suitable coagulants are alcohols, ketones, and esters, or mixtures of these. Preferably, the coagulant used is acetone, propanol or ethanol. If so desired, water may be added to the coagulant to obtain a coagulant containing less than 50 wt. % of water. However, it is preferred to employ a coagulant containing less than 10 wt. % of water, more particularly a coagulant which is essentially anhydrous.

From the same group of low-boiling organic solvents or mixtures of these solvents suitable washing liquids can be selected. Examples of such suitable washing liquids are alcohols, ketones, and esters, or mixtures of these. Preferably, the washing liquid used is acetone or ethanol. If so desired, water may be added to the washing liquid to obtain a washing liquid containing less than 50 wt. % of water. However, it is preferred to employ a washing liquid containing less than 10 wt. % of water, more particularly a washing liquid which is essentially anhydrous.

In an economically advantageous process the same liquid is employed as coagulant and as washing liquid.

After the solution has been coagulated and washed, the resulting product can be neutralised.

It was found that not only the content of cellulose-bound phosphorus in the solution, and hence the content of cellulose-bound phosphorus in the resulting product, but also the DP of the cellulose in the resulting product has an effect on the water or salt solution absorbency. Generally speaking, a higher DP in the product will give a higher water or salt solution absorbency (for the same content of cellulose-bound phosphorus).

The cellulose DP in the product preferably is higher than 200, particularly higher than 400, more particularly higher than 750.

Published patent application WO 96/06208 in the name of Applicant describes a process for making fibres from a solution containing cellulose, phosphoric acid and/or its anhydrides, and water. This process in combination with the process according to the present invention is pre-eminently suitable for making fibres with a high water and/or salt solution absorbency. In such a process the spinning solution is extruded through a spinneret having one or more orifices of a small diameter, and use is made of a coagulant and washing liquid which contains less than 50 wt. % of water, more particularly less than 10 wt. % of water, more particularly still is essentially anhydrous, such as acetone or ethanol. Such a process, moreover, makes it possible to produce fibres having high water absorption and high strength.

The cellulose products obtained by the process according to the present invention, which may be in many different forms, depending, int. al., on the way in which the cellulose solution has been extruded and coagulated, display excellent absorption of liquids such as water, (isotonic) salt solutions, and oil. These cellulose products also display flame retardant properties. In addition, these materials can be used as ion exchangers. The cellulose products possess good biodegradability and compostability.

Examples of such cellulose products include:

fibres obtained by extruding the solution through a spinneret having one or more orifices of small diameter, films obtained by extruding the solution through a narrow slot, granulate or fibroids obtained by contacting the solution, with vigorous stirring, with the coagulant, granulate or fibroids obtained by extruding the spinning solution through one or more orifices of large diameter, followed by the coagulated and washed product being chopped up into small pieces.

Of course, these cellulose products in their turn can be processed further, e.g., by weaving a fabric of cellulose fibres, by grinding cellulose fibres up into a pulp, or by making a non-woven out of cellulose fibres. Non-wovens can be obtained by wet-laid paper techniques known to the person skilled in the art using a liquid containing less than 50 wt. % water, preferably a liquid which is essentially anhydrous.

The obtained cellulose products with superabsorbent properties can be used in numerous application as, e.g., in:

| •personal care | disposable baby products | -diapers |
| --- | --- | --- |
| | | -training pants |
| | sanitary protection products | -sanitary towels |
| | | -pant-liners |
| | | -tampons |
| | | -incontinence diapers |
| •geotextiles | soil treatment | |
| | agri/horticultural applications | -synthetic mulch |
| •cable insulation | | |
| •others | Industrial spill control treatment | |
| | cosmetics | |
| | medical absorbents | -wound-dressing |
| | | -drapes used in surgical treatment |
| | drug delivery systems | |
| | packaging | -hazardous materials |
| | | -flowers and plants |
| | | -storage of fruits and vegetables |
| | food soaking pads | -meat trays |
| | filtration media | |
| | disintegration means in tablets | |
| | cat litter | |
| | artificial snow | |
| | robotic activators | |
| | sealing concrete blocks | |

Superabsorbent fibres or non-wovens are particularly suited to be used in:

| •superabsorbent layers in | - diapers |
| --- | --- |
| | - sanitary pads |
| •demisting fabric in | - packaging |
| | - filters |
| | - humidity control systems |
| •liquid or solid separations in | - filters |
| | - medical products |
| •controlled-release geotextiles | - soil separators |
| | - erosion control mechanisms |
| •gas permeable liquid barriers in | - protective clothing |
| | - filters |
| | - protection of communication cables |
| •heat absorption medium in | - emergency heat barriers |
| | - fire barriers |
| | - cooling methods |
| •wipes as | - wiping towels for restaurants |
| | - inductrial aqueous wipes |
| | - shop towels |
| | - wipes for the recreational sector (e.g. golf wipes) |
| | - graphic arts wiping cloths |
| | - lens-cleaning cloths |
| •medical disposables, e.g. in | - face masks |
| | - surgical gowns |
| | - head and shoe covers |
| | - scrub apparel |
| | - surgical packs |
| | - sterilisation wrap |
| | - isolation and patient gowns |
| | - compresses and bandages |
| | - sponges |
| | - bed linens and bedding protection for incontinence patients |

Further, superabsorbent films can be applied in training pants for toddlers, superabsorbent foams can be used in packaging, and superabsorbent emulsions can be used in waterblocking finishes, e.g., for cable insulation.

Obtained water soluble cellulose products can used as:

| •thickening agent in | - pigments (e.g. textile industry) |
| --- | --- |
| | - cosmetics |
| | - food |
| | - coatings |
| •warp size material in textiles | |
| •paper chemical | - to improve the mechanical strength of pulp |
| | - for surface sizing |
| | - as a carrier for optical brighteners |
| | - as a binder |
| | - as a viscosity regulator |
| •stabilising agent for disperse systems | - in coatings formulations |
| | - in pharmaceutical formulations |
| •oil field applications as | - viscosifier |
| | - flotating agent |

Cellulose products in the fibrous form are suitable to be used in textile applications. A further advantage of these products is their biocompatibility, which allows the use of these products in medical applications.

Continuous cellulose filaments obtained by the process according to the present invention, making use of an anisotropic solution as described in WO 96/06208, can be used as reinforcing material for technical applications, e.g., as reinforcing material in hose, conveyor belts, and car tyres.

It was further found that cellulose products having a phosphorus content of more than 5,5% can be (partially) water soluble and are especially suited to be used as thickeners, e.g., as thickeners for aqueous liquids. The solubility in water depends, a.o., on the concentration of cations and anions in the aqueous liquid.

By crosslinking the cellulose products, a non-soluble product can be obtained with a phosphorus content of more than 5,5 % and with a very high absorption for water or salt containing solutions.

Crosslinked products can be prepared in different ways, e.g., by heating the product in presence of an acid as phosphoric acid or carboxylic acid or by treatment with an bi-functional epoxide. Preference is given to the treatment with a bi-functional epoxide, since heating of the cellulose product also results in degradation of the cellulose backbone of these products. It was further found that products with excellent absorption properties can be obtained if these products are crosslinked directly after their preparation.

The process according to the present invention can be used to obtain cellulose products, e.g., fibres or pulp, having a free absorption in water of higher than 10 g/g and a free absorption in a salt solution of higher than 5 g/g, more in particular, a free absorption in water of higher than 20 g/g and a free absorption in a salt solution of higher than 10 g/g, with the free absorption in water and the free absorption in a salt solution being determined in accordance with a method specified hereinafter in this application. By crosslinking fibres obtained by the process according to the present invention with a phosphorus content of more than 6% and a DP larger than 300, cellulose products can be obtained with a free absorption in water higher than 100 g/g, more in particular higher than 125 g/g, and a free absorption in an isotonic salt solution (1 wt. % NaCl) higher than 20 g/g, more in particular higher than 30 g/g.

It was further found that the absorption of cellulose products obtained by the process according to the present invention is instantaneous. This is a further advantage over known superabsorbents containing salts of acrylic acids. For these materials it was found that it takes about 2 to 3 minutes to complete the absorption process.

Measuring methods

Determination of phosphorus content

The content of cellulose-bound phosphorus can be measured as described in WO 96/06208.

However, there is also a simpler way of determining the phosphorus content of cellulose products. To this end the cellulose product is tabletted after being dried in vacuo for some 15 hours at 50° C. Using an x-ray fluorescent emission spectrometer (e.g., a Philips PW 1400 with chromium tube, line: Kα, 50 kV, 50 mA, GE crystal, angle: 141.025, counting time: 50 s) the tablet's x-ray fluorescence intensity of phosphorus is then measured. By calibrating the spectrometer using tablets with a known phosphorus content, the measured intensity can be converted in a simple manner known to the skilled person to the phosphorus content of the specimen.

Determination of free absorption

Into a beaker (100 ml) 0,5 g of product is weighed. To it are added an amount (z g) of the liquid to be absorbed, e.g., distilled water, a 1% NaCl solution, or artificial urine. The whole is stirred. After 5 minutes the liquid is filtered off through a Büchner funnel (Weissband filter, d=125 mm) with the aid of a water jet pump and collected. The weight of the collected liquid is determined (x g). The free absorption (in g/g) equals (z−x)/0,5.

Alternatively, the moisture content of the filtrate can be determined by evaporation. In that case the absorption (in g/g) equals y/0,5, with y=the filtrate weight loss (in g) during evaporation.

Determination of absorption under pressure

Into a beaker 0,2 g of product is weighed. To it are added 25–50 g of the liquid to be absorbed, e.g., distilled water, a 1% NaCl solution, or artificial urine. The whole is stirred. After 5 minutes the contents of the beaker is (partially) transferred into filter crucible with a glass filter (porosity 0). The crucible is placed in the tube of a centrifuge equipped with a 2 cm bottom spacer. The tube is rotated for 5 minutes at such speed to cause a force equal to 1000 times the gravitational force. The contents of the crucible is weighed (=$W_{be}$ g). Then, the contents of the crucible is dried by heating at 140° C. The contents after drying is determined (=$W_{ae}$ g).

The absorption under pressure (in g/g) equals $(W_{be}-W_{ae})/W_{ae}$.

In some absorption measurements artificial urine was used. This artificial urine was prepared according to a description by Brian R. Shmaefsky in "How-to-do-it, artificial urine for laboratory testing," *The American Biology Teacher* Vol. 52, No. 3 (1990), 170–172. In the preparation of the artificial urine creatinin and albumin were not used.

Determination of DP

The degree of polymerisation (DP) of the cellulose was determined with the aid of an Ubbelohde type 1 (k=0,01). To this end the cellulose specimens to be measured were dried in vacuo for 16 hours at 50° C. after neutralisation, or the amount of water in the copper II ethylene diamine/water mixture was corrected to take into account the water in the cellulose. In this way an 0,3 wt. % of cellulose-containing solution was made using a copper II ethylene diamine/water mixture (1/1).

On the resulting solution the viscosity ratio (visc. rat. or $\eta_{rel}$) was determined, and from this the limiting viscosity ($\eta$) was determined in accordance with the formula:

$$[\eta] = \frac{\text{visc. rat} - 1}{c + (k \times c \times (\text{visc. rat.} - 1))} \times 100$$

wherein
 c=cellulose concentration of the solution (g/dl) and
 k=constant=0,25

From this formula the degree of polymerisation DP was determined as follows:

$$DP = \frac{[\eta]}{0.42} \text{ (for } [\eta] < 450 \text{ ml/g), or}$$

$$DP^{0.76} = \frac{[\eta]}{2.29} \text{ (for } [\eta] > 450 \text{ ml/g)}$$

Determining the DP of the cellulose in the solution proceeded as described above after the following treatment:

20 g of the solution were charged to a Waring Blender (1 liter), 400 ml of water were added, and the whole was then mixed at the highest setting for 10 minutes. The resulting mixture was transferred to a sieve and washed thoroughly with water. Finally, there was neutralisation with a 2%-NaHCO$_3$ solution for several minutes and after-washing with water. The DP of the resulting product was determined as described above, starting from the preparation of the copper II ethylene diamine/water/cellulose solution.

The invention will be elucidated with reference to the examples below.

Unless specified otherwise, the following starting materials with accompanying specifications were used to make the solutions in the examples.

| Material | Manufacturer and product code | $P_2O_5$ content [%] |
| --- | --- | --- |
| $P_2O_5$ | J. T. Baker, 0193 | 98 |
| $H_3PO_4$ | La Fonte Electrique SA, Bex Suisse crystallised, >99% (98,8% anal.) | 71,2 |
| $H_4P_2O_7$ | Fluke Chemika, 83210, 97%, (98,8% anal.) | 78,8 |
| PPA* | Merck, 85% min. | 84 |
| $H_2O$ | demineralised | — |

*PPA = polyphosphoric acid

EXAMPLE 1

51,5 g of powdered cellulose (Viskokraft, DP=700) were dissolved at 16° C. in a solvent containing 79,6 wt. % of $P_2O_5$. This solvent was obtained by mixing and kneading 74,1 g of orthophosphoric acid and 108,4 g of polyphosphoric acid for 40 minutes at 46° C. After 1,5 hours of mixing at 20° C. a homogeneous solution was obtained which contained 3,5 wt. % of cellulose-bound phosphorus. In a blender this solution was coagulated and washed in ethanol containing 8,6 wt. % of water. Next, the material was filtered through a Büchner funnel. The material was introduced into a mixture ethanol/water 7/3. The material was neutralised by the addition to the mixture of a 5% NaOH solution. After being neutralised the material was found to contain 3,0 wt. % of phosphorus. After being washed with ethanol and filtered through a Buchner filter, the material was dried for 16 hours in vacuum oven (200 mbar) at 25° C.

The resulting product (DP=500) had a free absorption of water of 12,6 g/g and a free absorption of a salt solution of 5,9 g/g.

The free absorption of a salt solution of the untreated powdered cellulose was 1 g/g.

EXAMPLE 2

In the same fashion as described in Example 1 18,8 g of Alphacell® (DP=2300) were dissolved at 12° C. in a solvent obtained by mixing 68,9 g of orthophosphoric acid and 101,5 g of polyphosphoric acid. After 6 hours of mixing at 12° C. the mixture was stored for 15 hours at 10° C. After this the solution was coagulated, washed, filtered, and neutralised in the manner described in Example 1. The material contained 5,3 wt. % of phosphorus prior to neutralisation and 4,0 wt. % of phosphorus after neutralisation.

The resulting material (DP=1000) had a free absorption of water of 23,8 g/g and a free absorption of a salt solution of 13,6 g/g.

EXAMPLE 3

In the same fashion as described in Example 1 26,0 g of cotton linters (DP=5900) were dissolved for 5 hours at 20–30° C. in a solvent obtained by mixing 119,0 g of orthophosphoric acid and 175,7 g of polyphosphoric acid. The solution was coagulated, washed, filtered, and neutralised in the manner described in Example 1. The material contained 4,5 wt. % of phosphorus prior to neutralisation and 3,5 wt. % of phosphorus after neutralisation.

The resulting material (DP=1850) had a free absorption of water of 30 g/g and a free absorption of a salt solution of 8,5 g/g.

EXAMPLE 4

In the same fashion as described in Example 1 26,0 g of cotton linters (DP=5900) were dissolved for over 6 hours at 20–35° C. in a solvent obtained by mixing 151,3 g of orthophosphoric acid and 228,0 g of polyphosphoric acid.

The solution was coagulated and washed in an acetone/ethanol mixture, and then filtered and neutralised, all in the manner described in Example 1. The material contained 11,9 wt. % of phosphorus prior to neutralisation and 7,4 wt. % of phosphorus after neutralisation.

The resulting material (DP=280) dissolved in water.

EXAMPLE 5

A solvent was prepared in a Linden-kneader by mixing and heating orthophosphoric acid and polyphosphoric acid in such a ratio that a solvent with a concentration of 74,4 wt. % $P_2O_5$ was obtained. Alphacell® cellulose (DP=2300) was added. After the cellulose had dissolved completely, extra polyphosphoric acid was added and an after mixing and kneading a solution was obtained containing 77,9 wt. % $P_2O_5$ and 10,7 wt. % cellulose (DP=350–370). By some reaction between cellulose and phosphoric acid, the content of cellulose-bound phosphorus and the DP of cellulose changed during the experiment.

These solution were extruded through a spinneret having 500 capillaries each with a diameter of 65 μm. The extruded solution was passed through an air gap, coagulated in a bath filled with acetone, washed at very low tension with acetone, and left to dry at room temperature.

To crosslink the obtained material, the fibre material was treated with a 5 wt. % solution of ethylene glycol diglycidyl ether in a 70/30 ethanol/water mixture. The reaction time was selected between 5 minutes and about 50 minutes to obtain the optimum absorption properties. After the crosslink treatment the material was washed with ethanol or a 70/30 ethanol/water mixture and neutralised using and ethanol/water/lye mixture.

The absorption properties of the thus obtained materials under pressure are listed in Table 1.

EXAMPLE 6

In a twin screw extruder a solution was prepared containing 76,6 wt. % $P_2O_5$ and 12,0 wt. % cellulose (DP=240). In the same way as described in example 5 this solution was extruded and the obtained fibres were coagulated, washed, crosslinked, and neutralised. The absorption properties of the thus obtained materials under pressure are listed in Table 1

TABLE 1

| Example | Phosphorus content (%) | pH of the material | absorption in water (g/g) | absorption in 1 wt. % NaCl solution (g/g) | absorption in artificial urine (g/g) |
|---|---|---|---|---|---|
| 5a | 5,0 | 12 | 40 | 15 | 8 |
| 5b | 5,4 | 7 | 95 | 25 | 13 |
| 5c | 5,6 | 7 | 35 | 12 | 9 |
| 6a | 7,3 | 7 | 10 | 7 | 6 |
| 6b | 7,3 | 12 | 10 | 7 | 5 |

EXAMPLE 7

In the same way as described in example 6 a solution was prepared containing 76,6 wt. % $P_2O_5$ and 12,0 wt. % cellulose. This solution was extruded, coagulated, washed and dried in the same way as described in example 5. Fibres were obtained with a DP=260 and a phosphorus content of 10,5%. These fibres were crosslinked by the crosslink treatment described in example 5 at 22° C. The obtained material was neutralised to pH=7 and left to dry at room temperature.

The absorption properties under pressure of this material was tested for solutions with different concentrations of different cations. The solutions were prepared using NaCl, $MgSO_4$, or $(CH_3COO)_2Ca.H_2O$. The absorption under pressure (in g/g) is given in Table 2

TABLE 2

| Concentration cations (mole/l) | $Na^+$ | $Mg^{2+}$ | $Ca^{2+}$ |
|---|---|---|---|
| — | 86 | 86 | 86 |
| 0,01 | 29 | 26 | 19 |
| 0,05 | 24 | 8 | 6 |
| 0,10 | 23 | 6 | 3 |
| 0,17 (=1 wt. % NaCl) | 24 | | |
| 0,25 | 13 | 5 | 2 |
| 0,50 | 13 | 5 | 2 |

EXAMPLE 8

In a Linden kneader a solution was prepared starting from Alphacell® cellulose (DP=2300) containing 12 wt. % cellulose and 76,7 wt. % $P_2O_5$. This solution was extruded, coagulated, washed and dried in the same way as described in example 5. Fibres were obtained with a DP=345 and a phosphorus content of 7,0%. These fibres were crosslinked by the crosslink treatment described in example 5 at 22° C. The obtained material was neutralised to pH=7 and left to dry at room temperature.

The thus obtained fibres showed an absorption under pressure in water=125 g/g and in a 1 wt. % NaCl solution=30 g/g.

EXAMPLE 9

In the same way as described in example 8 fibres were obtained with a DP=345 and a phosphorus content of 7,3%. These fibres were crosslinked by the crosslink treatment described in example 5 at 22° C. Before neutralisation the fibres showed an absorption under pressure in water=172 g/g. After a neutralisation treatment with lye to pH=12 the fibres showed an absorption under pressure in water=141 g/g and in a 1 wt. % NaCl solution=38 g/g.

EXAMPLE 10

18 Kg of solvent was prepared in a Linden-kneader by mixing and heating orthophosphoric acid and polyphosphoric acid in such a ratio that a solvent with a concentration of 74,3 wt. % $P_2O_5$ was obtained. This solvent was cooled to 8° C. and 3581 g Alphacell® C100 cellulose (DP=2300) was added. After the cellulose had dissolved completely (about 15 minutes of kneading), extra polyphosphoric acid was added and an after mixing and kneading at 22° C. for 25 minutes a solution was obtained containing 75,4 wt. % $P_2O_5$ and 13,3 wt. % cellulose.

This solution was extruded through a spinneret at 51° C. having 500 capillaries each with a diameter of 65 μm. The extruded solution was passed through an air gap of 45 mm and coagulated in a bath filled with acetone at 5° C. During the experiment several samples of the obtained yarn were taken. By some reaction between cellulose and phosphoric acid, the content of cellulose-bound phosphorus and the DP of cellulose changed during the experiment.

The obtained samples were washed at very low tension with acetone, and left to dry at room temperature at reduced pressure.

The dried samples were neutralised using and ethanol/water/lye mixture.

Before neutralisation the DP of the samples was measured. After neutralisation the cellulose-bound phosphorus content and the water absorption under pressure of these fibre samples was measured. The results are presented in Table 3.

TABLE 3

| Example | DP | Phosphorus content (wt. %) | Absorption in water (g/g) |
|---|---|---|---|
| 10a | 827 | 1,2 | 15 |
| 10b | 760 | 1,9 | 56 |
| 10c | 751 | 1,8 | 50 |
| 10d | 747 | 1,9 | 42 |
| 10e | 733 | 2,3 | 83 |

EXAMPLE 11

In a twin screw extruder a solution was prepared containing 76,6 wt. % $P_2O_5$ and 10,0 wt. % cellulose (Alphacell® C100 DP=2300). In the same way as described in example 10 this solution was extruded and the obtained fibres were coagulated and washed with acetone. The obtained yarn was cut into skeins with a length of 25–40 cm and washed again with acetone. The skeins were dried at room temperature.

Next, the skeins were treated with a 5 wt. % solution of ethylene glycol diglycidyl ether in a 70/30 ethanol/water mixture for 42 minutes. After this crosslink treatment the skeins were washed with ethanol and cut into short fibres with an average length of 6 mm.

These short fibres were opened and dispersed in a Lorentzen & Wettre dispersion unit in a 95/5 ethanol/water mixture. The obtained slurry was further dispersed and homogenised in a sheet forming unit until a slurry was obtained with a solid content of 0,011 wt. %. Using a fine screen pack the liquid was extracted from the slurry and a sheet was obtained. By drying the sheet on a cilinder, a cellulose non-woven sheet was obtained with a density of 31 g/m². The non-woven sheet has a water absorption under pressure of 95 g/g. The starting short fibres had a water absorption under pressure of 102 g/g. The fibre material before crosslinking had a cellulose-bound phosphorus content of 11,6 wt. % and a DP=242.

We claim:

1. A process for preparing a material having a high water and salt solutions absorbency, said material comprising cellulose, wherein (i) said cellulose is dissolved in a solvent comprising water and 65–85 wt. % phosphorus pentoxide to form a solution comprising 94–100 wt. % of
   cellulose,
   phosphoric acid and/or anhydrides, and
   water,
   and (ii) the solution is coagulated and washed in a liquid containing less than 50 wt. % of water.

2. A process according to claim 1, wherein the solution is coagulated and washed in a liquid containing less than 5 wt. % of water.

3. A process according to claim 1, wherein the solvent comprises water and 70–80 wt. % of phosphorus pentoxide.

4. A process according to claim 1, wherein the solution obtained by the process comprises more than 1.5 wt. % of phosphorus bound to the cellulose.

5. A process according to claim 3, wherein the solution obtained by the process comprises more than 3 wt. % of cellulose-bound phosphorus.

6. A cellulose product with a high water and salt solutions absorbency, wherein the product is obtained by the process according to claim 1, wherein the product comprises:
   a free water absorption of higher than 10 g/g, and
   a free salt solution absorption of higher than 5 g/g.

7. A cellulose product according to claim 6, wherein the product comprises more than 3 wt. % of cellulose-bound phosphorus.

8. A cellulose product according to claim 6 wherein the product comprises more than 1.5 wt. % of phosphorus bound to the cellulose.

9. A cellulose product according to claim 6, wherein the product comprises:
   a free water absorption of higher than 20 g/g and
   a free salt solution absorption of higher than 10 g/g.

10. A cellulose product according to claim 6 wherein the cellulose in the product has a DP of more than 400.

11. A cellulose product according to claim 10, wherein the cellulose in the product has a DP of more than 750.

12. A process for preparing a water soluble material, said material comprising cellulose, wherein (i) said cellulose is dissolved in a solvent comprising water and 65–85 wt. % phosphorus pentoxide to form a solution comprising 94–100 wt. % of
   cellulose,
   phosphoric acid and/or anhydrides, and
   water,
   and (ii) the solution is coagulated and washed in a liquid containing less than 50 wt. % of water.

13. A process according to claim 12, wherein the solution obtained by the process comprises more than 1.5 wt. % of phosphorus bound to the cellulose.

14. A process according to claim 12, wherein the solution is coagulated and washed in a liquid containing less than 5 wt. % of water.

15. A process according to claim 12, wherein said solvent comprises water and 70–80 wt. % of phosphorus pentoxide.

16. A process according to claim 13, wherein the solution obtained by the process comprises more than 3 wt. % of cellulose-bound phosphorus.

* * * * *

UNITED STATES PATENT AND TRADEMARK OFFICE
CERTIFICATE OF CORRECTION

PATENT NO. : 6,027,536
DATED : February 22, 2000
INVENTOR(S) : Jan Barend WESTERINK; Hanneke BOERSTOEL; and Hendrik MAATMAN It is certified that error appears in the above-identified patent and that said Letters Patent is hereby corrected as shown below:

Title page, in item [73], line 1, change "ARNHEMN" to --ARNHEM--.

Column 1, line 17, change "WO 93/112275" to --WO 93/12275--.

Column 5, lines 11-12, after "treatment", insert --cosmetics--;

line 13, delete "cosmetics"; and line 48, change "inductrial" to --industrial--.

Column 8, line 59, after "ethanol/water", insert --=--.

Column 10, line 40, change "Ca.H$_2$O" to --Ca·H$_2$O--.

Signed and Sealed this

Third Day of April, 2001

Attest:

NICHOLAS P. GODICI

*Attesting Officer*   *Acting Director of the United States Patent and Trademark Office*